United States Patent Office 3,238,183
Patented Mar. 1, 1966

3,238,183
AROMATIC POLY-1,3,4-OXADIAZOLES AND PROCESS OF MAKING SAME
August Henry Frazer, Wilmington, Del., assignor to E. I. du Pont de Nemours and Company, Wilmington, Del., a corporation of Delaware
No Drawing. Filed Jan. 28, 1963, Ser. No. 254,439
15 Claims. (Cl. 260—78.4)

This application is a continuation-in-part of my application Serial No. 800,366, filed March 19, 1959 and now abandoned.

This invention relates to a novel class of high molecular weight nitrogen-containing condensation polymers. More specifically, this invention relates to high molecular weight film- and fiber-forming nitrogen-containing condensation polymers which are characterized by high melting points and excellent chemical stability.

Numerous classes of nitrogen-containing condensation polymers are known, including the polyamides, polyurethanes, and polyureas. Several polymers of these types have demonstrated wide utility, and have been commercially prepared and exploited on a large scale. Although these polymers possess excellent properties in many respects, workers have continued the search for new polymeric compositions which exhibit outstanding properties for utilization in particular end uses. Polymers which incorporate heterocyclic rings as recurring units in the polymeric chain have not been widely examined.

It is an object of this invention to prepare a novel class of high molecular weight nitrogen-containing polymeric materials which are characterized by high melting points and high resistance to degradation. It is a further object of this invention to provide high molecular weight polymeric materials which comprise 1,3,4-oxadiazole rings conjugated with adjacent aromatic ring structures as recurring units in the polymeric chain. A further object of the invention is to provide shaped structures comprising these polymers.

In accordance with this invention, high molecular weight polyoxadiazoles are prepared from polyhydrazides or copolyhydrazides by an intra-linear ring-forming condensation. The latter materials may be prepared by the reaction between a dihydrazide of a dicarboxylic acid and a diacyl chloride. Mixtures of dihydrazides or of diacyl chlorides, or both, may be used, but there must be equimolar quantities of these two types of reactants.

The dihydrazide and the diacyl chloride reactants used as starting materials may be represented by the following structural formulae:

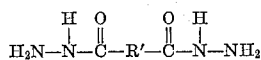

and

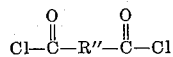

wherein R and R'' in the above formulae represent the portions between the two

groups and are inert divalent organic radicals as defined below. When R' is the same as R'', the result of polymerizing these reactants is a simple polyhydrazide. Copolyhydrazides result when R' differs from R'', or when mixtures of dihydrazides or diacyl chlorides are used. The dihydrazides and the diacyl chlorides which can be employed in the process may be aliphatic (a term which is intended to include cycloaliphatic), aromatic or aliphatic-aromatic compounds. R' may be aliphatic, aromatic, aliphatic-aromatic or a carbon-to-carbon single bond. R'' may be aliphatic having at least a chain of four carbon atoms between the two

groups, aromatic or aliphatic aromatic. Oxalyl dihydrazide is operable in the process of this invention, but oxalyl chloride is too reactive with the known solvents to be useful. Similarly, malonyl, succinyl and glutaryl chlorides cannot be used because they do not yield high molecular weight polymers as are necessary for the utilities described herein.

The diacyl chloride and the dihydrazides may contain a hetero atom in the ring or chain of atoms which separates the

groups. Such hetero atoms may be nitrogen, oxygen or sulfur. Among divalent radicals which separate the

groups there may be mentioned the aliphatic radicals, such as, 1–10 carbon alkylenes, and 1,4-cyclohexylene, and the aromatic radicals, such as, 1,3-phenylene, 1,4-phenylene, 2,5-dichloro-1,4-phenylene, 2,6-pyridine, 2,6-pyrazine, 2,5-furan, 2,5-thiophene, 2,5-pyrrole, 1,4-naphthalene, parabiphenylene, 5-(t-butyl)-1,3-phenylene, 4,4'-diphenyl ether, 4,4'-diphenyl methane, 2,2-bis(1,4-phenylene)-propane, and bis(1,3-phenyl-oxy) decamethylene.

As examples of operable reactants there are the dihydrazides of malonic acid, succinic acid, glutaric acid, and the dihydrazides and diacyl chlorides of adipic acid, pimelic acid, suberic acid, azelaic acid, sebacic acid, and other higher members of this homologous series, 1,4-cyclohexane-dicarboxylic acid, isophthalic acid, terephthalic acid, the naphthalene dicarboxylic acids, as 1,3-naphthalene-dicarboxylic acid, 1,4-naphthalene - dicarboxylic acid and other similar aromatic dicarboxylic acids which contain one or more aromatic nuclei. Also useful are the dihydrazides and diacyl chlorides of the aliphatic-aromatic dicarboxylic acids, as m- or p-phenylene diacetic acid, m- or p-phenylene dipropionic acid, and other similar members of this series.

Obviously, any of the above-described dihydrazides or diacyl chlorides may contain in addition, one or more inert substituents as methyl, ethyl, or other alkyl groups, chlorine or other halogen atoms, nitro groups, nitrile groups, etc.

The dihydrazide and the diacyl chlorides are reacted in equimolar proportions to form the polyhydrazides or copolyhydrazides consisting essentially of the following recurring structural unit:

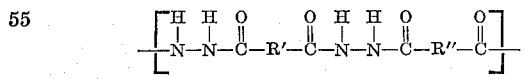

wherein R' and R'' are as defined above. The polyhydrazides or copolyhydrazides are readily formed upon reaction of the dihydrazides with the diacyl chlorides. A method of preparation illustrated in the examples is a low temperature reaction which takes place in the presence of an N-substituted amide which acts as a solvent for the reactants and the product and also serves as an acid acceptor for the released hydrogen chloride.

The polyhydrazides suitable for the instant invention will ordinarily have inherent viscosities, when measured in dimethylsulfoxide (30° C.), of at least 0.2 and preferably at least 0.4. The melting points of these polyhydrazides will be at least 200° C. and preferably greater than 300° C.

When the polyhydrazides or copolyhydrazides are subjected to an intra-linear dehydration-cyclization, poly (1,3,4-oxadiazoles) are produced. These polymers consist essentially of the following recurring structural unit:

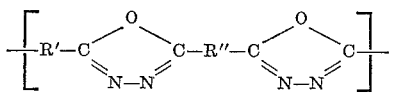

wherein R' and R" are divalent organic radicals as defined above. R' and R" in the above recurring units may be the same, as would be evidenced in a homopolymer prepared from a polyhydrazide precursor, while copolymers result from polyhydrazide precursors wherein R' and R" are not alike.

The polyhydrazide or copolyhydrazide is heated to effect the dehydration and conversion to the polymeric 1,3,4-oxadiazole. The dehydration may be carried out by heat alone or the heating may be preceded by a chemical dehydration treatment with conventional dehydrating agents. The process may be carried out on polymer in any form. Thus the polyhydrazide or copolyhydrazide may be in the form of a powder or other random state of division or the conversion may be effected on a shaped structure, as a film, fiber, or the like. The process thus permits the preparation of shaped structures of poly (1,3,4-oxadiazoles) by shaping the polymeric precursor into the desired form followed by conversion to the oxadiazole. This is a great advantage in view of the fact that the high melting point and relative insolubility of many poly (1,3,4-oxadiazoles) render the shaping of these polymers by conventional procedures difficult and many times impractical.

Generally, heating at a temperature above about 170° C., but preferably below the melting point of the polyhydrazide or copolyhydrazide, for a period of up to several days and preferably at a reduced pressure of about 5 mm. or less is sufficient to convert the polymeric material into the corresponding poly (1,3,4-oxadiazole). The length of time necessary for complete conversion varies with the nature of the polyhydrazide or copolyhydrazide and the physical form in which this polymer exists when the conversion is carried out. Thus, oriented films and fibers require a longer time for complete dehydration-cyclization than do unoriented films and fibers.

The course of the reaction may be followed by periodic infrared analysis, indicating the disappearance of the carbonyl and imido bands and the concurrent appearance of the band characteristic of the 1,3,4-oxadiazole nucleus. A second means of following the course of the reaction exists in the periodic analysis of the polymer for oxygen content. There is sufficient difference in oxygen content between the polyhydrazide or copolyhydrazide and the resulting 1,3,4-oxadiazole polymer to make possible a determination of the extent of reaction.

High molecular weight polymeric oxadiazoles, i.e., having minimum inherent viscosities of 0.2, prepared by the process of this invention are highly stable to hydrolysis. They are also stable to heat and light, and can be employed in the form of fibers, films, etc. Surprisingly, however, the polymeric oxadiazoles having organic aromatic groups as part of the polymeric chain, located immediately adjacent to the oxadiazole chain links (referred to hereafter as aromatic polyoxadiazoles), in order that conjugation between the oxadiazole ring and aromatic group may occur are markedly superior to other oxadiazoles as regards stability. These aromatic groups comprise both benzene-aromatic and hetero-aromatic groups which may also bear non-reactive substituents. For purposes of this invention aromatic groups include divalent radicals wherein one or both of the terminal parts are aromatic although such parts are separated by aliphatic radicals. A preferred class of such aromatic polyoxadiazoles consists of those members whose polymeric chains are composed exclusively of aromatic rings. These preferred polyoxadiazoles which are free of aliphatic groups in the polymer chain have appreciably higher melting points (e.g., melting points in excess of 400° C.) and higher decomposition temperatures (at least 50° C. higher) than the aliphatic radical containing polyoxadiazoles (e.g., decomposition temperatures in excess of 450° C.). These properties particularly suit them for structural uses at elevated temperatures where full advantage may be taken of their excellent thermal, hydrolytic and photo stabilities.

The aromatic polyoxadiazoles of this invention consist essentially of recurring structural units selected from the class consisting of

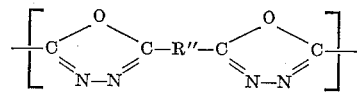

and

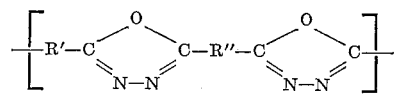

wherein R' and R" represent divalent aliphatic or aromatic radicals of no more than 14 carbon atoms each, with the proviso that when R' is aliphatic, R" is not, and further, at least one of R' and R" must contain more than four carbon atoms. The polymers have inherent viscosities greater than 0.2. Exemplary of such aromatic radicals there may be mentioned 1,3-phenylene, 1,4-phenylene, 2,5-thiophene, 4,4'-diphenyl ether, 2,2-bis(1,4-phenylene) propane and other divalent aromatic radicals previously set forth. Divalent aliphatic radicals may be illustrated by $\text{-(CH}_2\text{)}_n\text{-}$, where $n$ is an integer of from one to ten, cyclohexane, etc. The radicals may be substituted by lower alkyl substituents, such as, methyl, ethyl and propyl radicals, by halogen atoms such as chlorine and bromine or by nitrile or nitro groups, etc. Hetero atoms such as nitrogen, oxygen and sulfur may also appear in the chain or ring. For ease of preparation, availability of materials and stability, it is preferred that both R' and R" be aromatic carbocyclic radicals and still more preferably, 1,3-phenylene, 1,4-phenylene and the lower alkyl and halo-derivatives thereof. Illustrations of aromatic polyoxadiazoles and their preparation appear in the examples below.

The aromatic poly(1,3,4-oxadiazoles) of this invention are characterized by excellent properties and stabilities. They are high melting, high tenacity polymers which may be used and tested in the form of highly oriented films and fibers. The oriented fibers are quite stable to light, retaining more than 70% of their original properties after 1,000 hours exposure in a Fade-Ometer. The aromatic-conjugated-oxadiazole nucleus is resistant to hydrolysis, even at elevated temperatures. Thus, poly[1,3-phenylene-2,5-(1,3,4-oxadiazole)-1,4-phenylene - 2,5 - (1,3,4 - oxadiazole)] retains more than 75% of its original tenacity after 1,000 hours at 90° C. in 30% sodium hydroxide or sulfuric acid solutions. The aromatic poly-(1,3,4-oxadiazoles) exhibit excellent retention of properties after prolonged exposure to elevated temperatures. For example, poly[1,3-phenylene-2,5-(1,3,4-oxadiazole)] retains at least 50% of its original tenacity after 700 hours at a temperature of 300° C., after 150 hours at a temperature of 400° C., and after one hour at a temperature of 500° C. The polymers are also characterized by high flex lives, of up to 110,000 cycles for poly[1,3-phenylene-2,5-(1,3,4-oxadiazole)].

The following examples will illustrate the process and product of the present invention, but are not intended to limit it in any way. The inherent viscosities have been determined in all cases in accordance with the following formula:

$$\eta_{inh} = \frac{\ln \eta_{rel}}{c}$$

The relative viscosity ($\eta_{rel}$) may be determined by dividing the flow time in a capillary viscometer of a dilute solution of the polymer by the flow time for the pure solvent. The concentration (c) is generally 0.5 gram of polymer per 100 ml. of solution, and the measurements are made at a temperature of 30° C. These inherent viscosities of the polyoxadiazoles are, in every case, measured in conc. sulfuric acid (98%) inasmuch as the polymers are generally insoluble in organic solvents.

*Example I*

A solution of 48.5 grams of isophthaloyl dihydrazide in 325 ml. of N-methylpyrrolidone containing 15 grams of lithium chloride is cooled in an ice bath. To this stirred, cool solution are added 50.75 grams of isophthaloyl chloride, and the reaction mixture is stirred overnight. The resulting polyisophthaloyl hydrazide is precipitated by pouring the solution into water, and is washed free of acid. The white polymer is washed once with methanol. The resulting polyhydrazide is characterized by a polymer melt temperature of 370° C. and an inherent viscosity in dimethyl sulfoxide of 0.50 and in sulfuric acid of 0.10. A strong absorption is noted in the infrared at 6.03 microns (carbonyl) and 3.07 microns (imide). Oxygen analysis of the product is 19.8% (theory—19.7%).

The above prepared polyisophthaloyl hydrazide is converted to the corresponding poly(1,3,4-oxadiazole) by heating at a temperature of 283° C. for eight hours at 1 mm. pressure. This all-aromatic poly(1,3,4-oxadiazole) exhibits a polymer melt temperature in excess of 400° C. and an inherent viscosity in sulfuric acid of 0.45 (it is insoluble in dimethyl sulfoxide). No absorption is noted in the infrared at 6.03 microns or 3.07 microns but there is strong absorption at 10.2 microns (a band characteristic of 1,3,4-oxadiazole). On analysis there is found an oxygen content of 11.4% (theory—11.1%).

*Example II*

Polyisophthaloyl hydrazide, prepared as in Example I, is soluble in dimethyl sulfoxide, and may be spun into fibers from this solvent. The resulting fibers may be converted, while retaining the filamentary form, to poly[1,3-phenylene-2,5-(1,3,4-oxadiazole)]

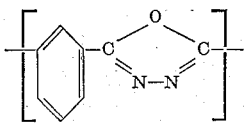

by heating to a temperature of 283° C. for 8 hours at 1 mm. pressure. Films of polyisophthaloyl hydrazide may also be prepared from dimethyl sulfoxide solution and converted to the oxadiazole by an analogous route.

*Example III*

A 43% solids solution of polyisophthaloyl hydrazide in dimethyl sulfoxide is prepared. This solution is spun through a spinneret at a temperature of 140° C. into a column heated to a temperature of 200° C. The resulting fiber is drawn 3× at 10 pounds of steam pressure, and an additional 1.95× at 30 pounds of steam pressure. It may be converted to the corresponding 1,3,4-oxadiazole by heating to a temperature of 277° C. at a pressure of 0.25 mm. for 140 hours.

The resulting poly[1,3 - phenylene - 2,5 - (1,3,4 - oxadiazole)] exhibits a tenacity/elongation/modulus ratio of 2.4/15/82, a fiber stick temperature in excess of 400° C., and an inherent viscosity of 0.98 as measured in sulfuric acid. Its flex life is between 55,000 and 60,000 cycles for a 3.5 denier (0.389 tex) fiber. The half-tenacity life is 700 hours or more at a temperature of 300° C., 150 hours at a temperature of 400° C., and 1 hour at a temperature of 500° C. The fiber retains 92% of its original tenacity when tested at 100° C. or at 200° C., 70% when tested at 260° C., and 50% when tested at 300° C. Exposure to sodium hydroxide solutions of 10% concentration, 30% concentration, and 50% concentration demonstrates that at least 75% of the original fiber tenacity is retained after 1,000 hours at temperatures up to 60° C. Exposure to sulfuric acid solutions of 10% concentration and 30% concentration for 1,000 hours at temperatures of up to 90° C. does not lower the tenacity below 80% of its original value.

*Example IV*

Isophthaloyl hydrazide, in the amount of 9.7 grams, is dissolved in 19 ml. of hexamethylphosphoramide and to this stirred, cooled solution are added 10.15 grams of terephthaloyl chloride. The reaction mixture, cooled by means of an ice bath, is stirred overnight, and the polymer is separated and washed as in Example I. The copolyhydrazide exhibits a polymer melt temperature above 400° C. and fibers and films may be prepared from dimethyl sulfoxide solution. A fiber of the copolyhydrazide is drawn 2–3× at 10 pounds of steam pressure and additional 1.95× under 30 pounds of steam pressure.

The thus oriented copolyhydrazide fiber is heated at a temperature of 283° C. at a pressure of 0.25 mm. for 140 hours, and by this process the dehydration-cyclization conversion to the all-aromatic poly[1,3-phenylene-2,5-(1,3,4-oxadiazole)-1,4-phenylene - 2,5-(1,3,4-oxadiazole)]

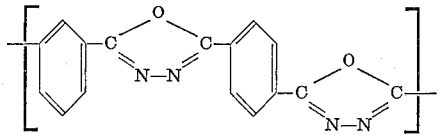

is effected. The resulting fiber exhibits a tenacity/elongation/modulus ratio of 3.2/15/89, and an inherent viscosity in sulfuric acid of 0.98. The flex life is 110,000 cycles for a 3-denier (0.33 tex) fiber. The original tenacity of the fiber is not lowered below 75% of its original value by exposure for 700 hours to a temperature of 300° C., for 150 hours to a temperature of 400° C., or for 1 hour to a temperature of 500° C. Following 1,000 hours exposure in a Fade-Ometer, at least 70% of the original tenacity is retained.

Testing the fiber at elevated temperatures indicates marked retention of physical properties. Thus, 90% of the original tenacity is retained when tested at 100° C., 88% is retained when tested at 200° C., 75% is retained when tested at 260° C., and 56% is retained when tested at 300° C. At least 75% of the original tenacity is retained after 1,000 hours in sodium hydroxide solutions of 10%, 30%, or 50% concentration at temperatures of up to 60° C., and in 10% or 30% sodium hydroxide solutions at temperatures of up to 90° C. In sulfuric acid solutions, at least 80% of the original tenacity is retained following 1,000 hours in a 30% solution at temperatures of up to 90° C., and more than 85% is retained after 1,000 hours in 50% sulfuric acid at 30° C.

*Example V*

To a solution of 8.7 grams of adipyl dihydrazide in 80 ml. of hexamethylphosphoramide is added, with cooling by means of an ice bath, 10.15 grams of isophthaloyl chloride. The reaction mixture is stirred during the addition, and stirring is continued overnight. The resulting copolyhydrazide is isolated and washed as described in Example I. It exhibits a polymer melt temperature of 32° C., and an inherent viscosity, measured in dimethyl sulfoxide, of 0.41.

Five grams of the above product, which has an oxygen content of 22.3%, is heated for 8 hours at a temperature of 255° C., and a pressure of 0.05 mm. The resulting poly[1,3-phenylene-2,5-(1,3,4-oxadiazole) - 1,4-butylene-2,5-(1,3,4-oxadiazole)] exhibits an oxygen content of 12.87% (theory—12.8%), a polymer melt temperature in excess of 400° C., an inherent viscosity in sulfuric acid of 0.31, and the characteristic absorption of the oxadiazole ring at 10.20 microns with no imide absorption in the infrared.

Example VI

A solution of 3.93 grams of oxalyl dihydrazide in 50 ml. of hexamethylphosphoramide is cooled by means of an ice bath. While stirring this solution, 6.03 grams of adipyl chloride are added, and stirring is continued for about 2 hours, until gelation occurs. Upon isolation of the polymer, it is found to possess a polymer melt temperature of 345° C., and an inherent viscosity in dimethyl sulfoxide of 0.23. Its oxygen content is 28.1.

A 5-gram sample of the copolyhydrazide is heated for 4 hours at a temperature of 255° C. and a pressure of 0.05 mm. The polymeric 1,3,4-oxadiazole which results analyzes for 16.6% oxygen (theory—16.7%). No absorption in the infrared characteristic of the imide linkage is exhibited. Absorption at 10.20 microns, typical of the oxadiazole ring, is evidenced. The poly[1,4-butylene-bis-2,5-(1,3,4-oxadiazole)]

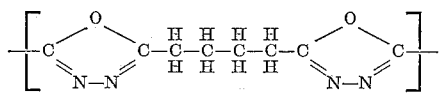

has an inherent viscosity in sulfuric acid of 0.20 and a polymer melt temperature in excess of 400° C.

Example VII

Adipyl chloride, in the amount of 9.15 grams, is added to a solution of 8.7 grams of adipyl dihydrazide in 100 ml. of hexamethylphosphoramide. The reaction mixture is cooled by means of an ice bath during the addition of the adipyl chloride, and stirring is continued for approximately 4 hours until gelation occurs. Isolation of the polymer is effected as described in Example I, and the polyhydrazide exhibits a polymer melt temperature of 290° C. It is not soluble in nondegradative solvents.

Five grams of polyadipyl hydrazide is heated at a temperature of 255° C. for 4 hours at 0.05 mm. pressure. The oxygen content of the polyhydrazide is 22.3% and the resulting oxadiazole analyzes for 12.95% oxygen (theory—12.9%). The oxadiazole has a polymer melt temperature of 390–400° C. and an inherent viscosity in sulfuric acid of 0.38. The poly[1,4-butylene-2,5-(1,3,4-oxadiazole)] shows the characteristic absorption of the oxadiazole ring at 10.20 microns and no imide absorption in the infrared.

Example VIII

A solution of 5.9 grams of oxalyl dihydrazide in 80 ml. of hexamethylphosphoramide is cooled in an ice bath. To this solution are added, while stirring, 10.15 grams of isophthaloyl chloride, and stirring is continued overnight. Following isolation and washing, the polymer has an inherent viscosity in dimethyl sulfoxide of 1.43 and a polymer melt temperature of 366° C. Its oxygen content is 27.4%.

Heating of a 5-gram sample of the above product at a temperature of 255° C. for 8 hours at 0.05 mm. pressure lowers the oxygen content to 16.93% (theory for the corresponding polyoxadiazole is 16.8%). The polymer shows the characteristic absorption of the oxadiazole ring at 10.20 microns, and no imide absorption in the infrared. This all-aromatic poly[1,3-phenylene-bis-2,5-(1,3,4-oxadiazole)] has a polymer melt temperature in excess of 400° C., and an inherent viscosity in sulfuric acid of 0.28.

Example IX

An all-aromatic polyhydrazide is prepared by reacting overnight 5.06 grams of 1,4-naphthalene dicarbonyl chloride with 3.88 grams of isophthaloyl dihydrazide in 50 ml. of cold hexamethylphosphoramide. The polyhydrazide is precipitated in water, and washed three times with water and three times with methanol. The dried polymer has a melting point in excess of 400° C., an inherent viscosity of 0.68 in dimethylsulfoxide and a C/H/O/N analysis of 62.9/5.3/16.8/14.7% (theory—63.2/5.3/16.8/14.7%).

This high molecular weight all-aromatic polyhydrazide is converted to poly[1,4-naphthanene-2,5-(1,3,4-oxadiazole)-1,3-phenylene-2,5-(1,3,4-oxadiazole)] by a heat treatment at 285° C. for eight hours under vacuum. This all-aromatic polyoxadiazole has a melting point in excess of 400°, an inherent viscosity of 0.43 in sulfuric acid and a C/H/O/N analysis of 68.7/4.8/9.7/15.8% (theory—68.9/4.6/9.3/16.2%).

Example X

The process of Example IX is repeated except for changing the dicarbonyl chloride to 5.18 grams of m(t-butyl)-isophthaloyl chloride. The copolyhydrazide exhibits an inherent viscosity of 0.62 in dimethylsulfoxide, a polymer melt temperature in excess of 400° C., and a C/H/O/N analysis of 64.0/3.9/17.0/14.8% (theory—64.2/3.9/17.1/14.9%). After the conversion to poly-[5 - (t - butyl) - 1,3 - phenylene - 2,5 - (1,3,4 - oxadiazole)-1,3-phenylene - 2,5 - (1,3,4 - oxadiazole)], this all-aromatic polyoxadiazole exhibits a melting point in excess of 400° C., an inherent viscosity of 0.34 in sulfuric acid and an analysis of 71.0/2.9/9.9/16.1% (theory—71.1/2.9/9.5/16.5%).

Example XI

Again, the procedure of Example IX is repeated except for employing pyridine-2,6-dicarbonyl chloride as one of the initial reactants. The copolyhydrazide product has a melting point of 380° C., and an inherent viscosity of 0.7 in dimethylsulfoxide. It is converted at 240° C. in three hours to poly-[2,6-pyridine-2,5-(1,3,4-oxadiazole)-1,3-phenylene-2,5-(1,3,4-oxadiazole)]

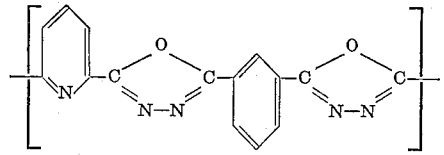

whose melting point is in excess of 400° C. and whose inherent viscosity in sulfuric acid is 0.6.

Example XII

A 2.72-gram portion of 2.5-dichloro-terephthaloyl chloride is added in three portions to a cold solution of 40 ml. hexamethylphosphoramide containing 1.94 grams isophthaloyl dihydrazide. The mixture is stirred vigorously, and the reaction proceeds for about two hours in an ice water bath and for an additional 21 hours at room temperature. The copolyhydrazide is then precipitated in water, washed three times with distilled water and three times with methanol to yield a polymer whose inherent viscosity in dimethylsulfoxide is 0.65 and whose melting point is above 400° C.

This copolyhydrazide is converted to poly-[2,5-dichloro - 1,4 - phenylene - 2,5 - (1,3,4 - oxadiazole) - 1,3-phenylene-2,5-(1,3,4-oxadiazole)]

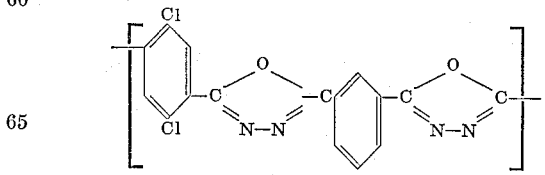

by a 24 hour heat treatment under vacuum at 260° C. This all-aromatic polyoxadiazole exhibits an inherent viscosity of 0.2 and a melting point in excess of 400° C.

Example XIII

A mixture of 1.94 grams of isophthaloyl dihydrazide in 20 ml. of hexamethylphosphoramide is stirred under nitrogen and cooled in an ice bath. Over a five minute period are added 2.95 grams of diphenyl ether 4,4′-dicarbonyl chloride. Stirring is continued overnight at room temperature. The resulting clear, colorless viscous solution is precipitated into water. The polymer is washed, isolated, and dried. The yield is 4.3 grams of polymer with a melt temperature of 305° C., an inherent viscosity of 0.8, and an oxygen analysis of 19.2% (theory—19.2%).

This copolyhydrazide is heated at 185° C. under vacuum for a prolonged period and then at 305° C. to convert it to poly[4,4′-diphenyl ether-2,5(1,3,4-oxadiazole)-1,3 - phenylene - 2,5(1,3,4 - oxadiazole)] with concurrent change in oxygen analysis to 13% (theory—12.6%). The inherent viscosity of the product is 1.45 and the melting point is 305° C.

*Example XIV*

The aliphatic poly-1,8-octamethylene hydrazide may also be converted to poly[1,8-octamethylene-2,5(1,3,4-oxadiazole)] by the process of this invention. The polyhydrazide is heated at 200° C. for two hours under vacuum with an observed weight loss of 8.5% (theory—9.1%, due to the elimination of water during the intramolecular oxadiazole ring formation). The non-all-aromatic polyoxadiazole product exhibits a melting point of 300° C. and an inherent viscosity in sulfuric acid of 0.25. This polymer begins to undergo thermal degradation at temperatures just above 400° C. In comparison, the all-aromatic polyoxadiazole of Example IV does not degrade appreciably until temperatures in excess of 475° C. are reached.

Aromatic polymeric 1,3,4-oxadiazoles are characterized by an aggregation of outstanding properties that render them especially useful in numerous applications. Of particular value are the films and fibers which comprise these polymers. Their high melting points; excellent stability to heat, light, and hydrolytic conditions; high flex lives; toughness, and retention of properties under adverse conditions are of particular value. Films of these polymers are useful as covering and protective agents, even in those areas where corrosive conditions prevail. These films may be used as drum liners, as outdoor coverings, for the protection of perishable goods, and in numerous other applications. Fibers of the polymers of this invention may be woven or knit into fabrics which will retain their properties for extended periods, even in uses where other fibers rapidly deteriorate. They may find application in numerous industrial and textile uses.

What is claimed is:

1. An aromatic polyoxadiazole consisting essentially of recurring structural units selected from the class consisting of

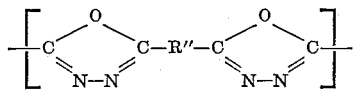

and

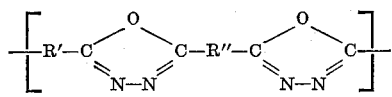

wherein R′ and R″ represent a member of the group consisting of divalent aliphatic and aromatic radicals of no more than 14 carbon atoms each with the proviso that R″ is other than aliphatic when R′ is aliphatic, and further, at least one of R′ and R″ must contain more than three carbon atoms in a continuous chain, the said polymer having an inherent viscosity greater than 0.2 when measured in 98% sulfuric acid at a concentration of 0.5 gram per 100 ml. of solution at 30° C.

2. A polymer in accordance with claim 1 whose chain is free of aliphatic radicals.

3. An aromatic polyoxadiazole consisting essentially of the following recurring structural unit

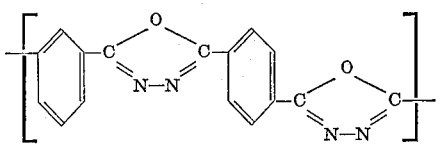

said polymer having an inherent viscosity in 98% sulfuric acid of at least 0.2 when measured at 30° C. and at a concentration of 0.5 gram per 100 ml. of solution.

4. An aromatic polyoxadiazole consisting essentially of the following recurring structural unit

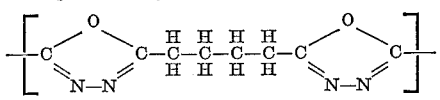

said polymer having an inherent viscosity in 98% sulfuric acid of at least 0.2 when measured at 30° C. and at a concentration of 0.5 gram per 100 ml. of solution.

5. An aromatic polyoxadiazole consisting essentially of the following recurring structural unit

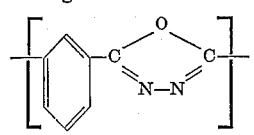

said polymer having an inherent viscosity in 98% sulfuric acid of at least 0.2 when measured at 30° C. and at a concentration of 0.5 gram per 100 ml. of solution.

6. An aromatic polyoxadiazole consisting essentially of the following recurring structural unit

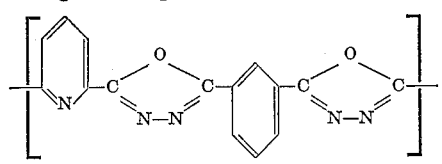

said polymer having an inherent viscosity in 98% sulfuric acid of at least 0.2 when measured at 30° C. and at a concentration of 0.5 gram per 100 ml. of solution.

7. An aromatic polyoxadiazole consisting essentially of the following recurring structural unit

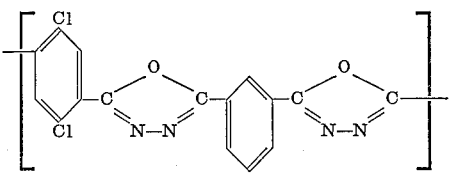

said polymer having an inherent viscosity in 98% sulfuric acid of at least 0.2 when measured at 30° C. and at a concentration of 0.5 gram per 100 ml. of solution.

8. A process for the preparation of a high melting point polymer which comprises heating polyisophthaloyl hydrazide having an inherent viscosity of at least 0.2 when measured in dimethyl sulfoxide at a temperature above about 170° C. but below that of its melting point and for a time sufficient to convert said polymeric hydrazide into the corresponding poly(1,3,4-oxadiazole).

9. A process for the preparation of a high melting point polymer comprising heating an isophthaloyl terephthaloyl copolyhydrazide having an inherent viscosity when measured in dimethyl sulfoxide of at least 0.2 to a temperature above 170° C. but below the melting point of the copolyhydrazide and for a time sufficient to convert said polymeric hydrazide into the corresponding poly(1,3,4-oxadiazole).

10. A process for the preparation of a high melting point polymer comprising heating polyadipyl hydrazide having an inherent viscosity when measured in dimethyl sulfoxide of at least 0.2 to a temperature of at least about 170° C. but below the melting point of the polyhydrazide and for a time sufficient to convert said polymeric hydrazide into the corresponding poly(1,3,4-oxadiazole).

11. A method for the production of a shaped poly-(1,3,4-oxadiazole) article comprising preparing the shaped structure from a polyhydrazide having an inherent viscosity when measured in dimethyl sulfoxide of at least 0.2 and a melting point of at least 200° C. and heating the shaped structure to a temperature above 170° C. but below the melting point of the polyhydrazide for a time sufficient to convert the polyhydrazide to the poly(1,3,4-oxadiazole).

12. A process for the preparation of high molecular weight polymers consisting essentially of the following recurring structural unit:

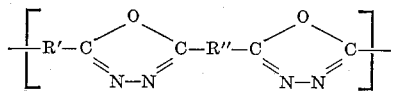

wherein R′ is selected from the group consisting of divalent aliphatic and aromatic radicals of up to 14 carbon atoms and a single carbon-to-carbon bond and R″ is selected from the group consisting of aromatic radicals and aliphatic radicals of at least four carbon atoms, which comprises heating a polymeric structure having an inherent viscosity when measured in dimethyl sulfoxide of at least 0.2 and a melting point of at least 200° C. and having the following recurring structural unit:

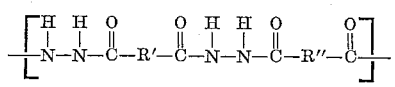

wherein R′ and R″ have the same significance as above at a temperature above about 170° C. but below the melting point of the polymeric precursor sufficient to convert said precursor into the corresponding polyoxadiazole.

13. The process of claim 11 wherein the precursor is heated at a pressure of up to about 5 mm.

14. A process for making a high melting point polymer which comprises heating polyisophthaloyl hydrazide having an inherent viscosity when measured in dimethyl sulfoxide of at least 0.2 to a temperature above about 170° C. but below that of the polyhydrazide melting point, at a pressure of up to about 5 mm. and for a time sufficient to convert the polyhydrazide into the corresponding polyoxadiazole.

15. An aromatic polyoxadiazole consisting essentially of the following recurring structural unit:

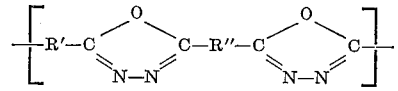

wherein R′ and R″ represent a member of the group consisting of aromatic carbocyclic radicals and the lower alkyl and halo derivatives thereof, the said polymer having an inherent viscosity greater than 0.2 when measured in 98% sulfuric acid at a concentration of 0.5 gram per 100 ml. of solution at 30° C.

References Cited by the Examiner
UNITED STATES PATENTS

| | | | |
|---|---|---|---|
| 2,395,642 | 2/1946 | Prichard | 260—78 |
| 2,404,717 | 7/1946 | Houtz | 260—78 |
| 2,476,968 | 7/1949 | Wotherspoon | 260—78 |
| 2,512,631 | 6/1950 | Fisher | 260—78 |
| 2,512,891 | 6/1950 | Wotherspoon | 260—78 |
| 2,615,862 | 10/1952 | McFarlane | 260—78 |
| 2,765,304 | 10/1956 | Siegrist | 260—78 |
| 2,816,897 | 12/1957 | Wolf | 260—78 |

WILLIAM H. SHORT, *Primary Examiner.*